Figure 1:
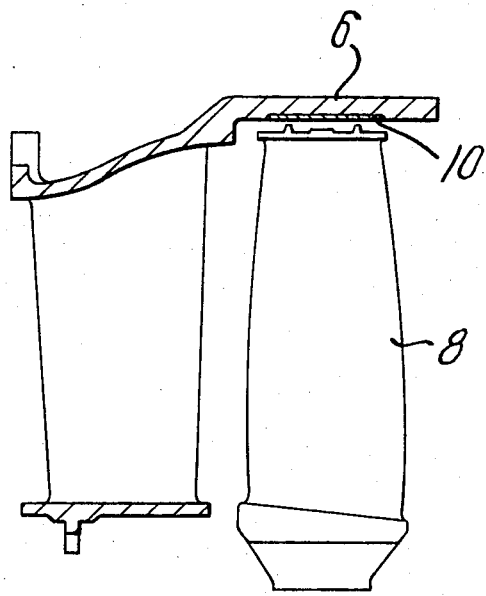

United States Patent

Dunthorne

[11] 3,836,156
[45] Sept. 17, 1974

[54] ABLATIVE SEAL
[75] Inventor: Hector B. Dunthorne, Verdun, Quebec, Canada
[73] Assignee: United Aircraft of Canada Limited, Longueuil, Quebec, Canada
[22] Filed: Aug. 19, 1971
[21] Appl. No.: 173,321

[30] Foreign Application Priority Data
July 19, 1971 Great Britain................. 33696/71

[52] U.S. Cl.................................. 277/53, 415/174
[51] Int. Cl........................ F16j 15/44, F01d 11/08
[58] Field of Search............ 277/26, 53; 415/9, 174

[56] References Cited
UNITED STATES PATENTS
2,742,224  4/1956  Burhans............................ 415/174

Primary Examiner—Louis R. Prince
Assistant Examiner—Robert I. Smith
Attorney, Agent, or Firm—Alan Swabey

[57] ABSTRACT

A composite sealing structure for sealing the gap between stationary and moving surfaces of a gas impelling device, for example a turbine. Preferably, the sealing structure is on the surface of the stationary member. The sealing structure is adapted, in the event of a rub, to melt immediately at the rubbed surface whereby the metal is molten and readily displaced to allow free passage of the rubbing surface of the other member. The sealing structure includes an outer sealing layer as the proximate surface of one member and an intermediate bonding layer bonding the sealing layer to the surface of the member. The sealing layer is of a metal alloy having a melting point close to, but above the operating temperature in the impelling device and below the melting point of the surface of the one member. The bonding layer is of an alloy compatible with the sealing layer alloy and with the base metal, forms a firm bond with both the sealing layer and the base metal surface, is adapted to melt initially at a temperature lower than that of either, has a remelt temperature above the operating temperature of the impelling device, and good strength at the operating temperature. Preferably, the alloys used for the sealing and bonding layers are brazing alloys.

6 Claims, 2 Drawing Figures

ABLATIVE SEAL

BACKGROUND OF THE INVENTION

This invention relates to sealing the gap between the rotating and stationary members of a gas impelling device.

In many cases, the efficiency of gas impelling devices, for example, gas turbines and compressors, depends on minimizing this gap. Because of the differences in the co-efficient of expansion of the respective metal components running close together within narrow tolerances, as the temperature rises in the device, it is necessary either to leave a large enough gap to allow for the expansion so as to avoid rubbing at all extremes of operating temperature or to provide for limited rubbing between the rotating and stationary members by providing means to prevent damage to the rotating or stationary member or both.

This has given rise to various attempts to provide a seal between the stationary and rotating parts of gas impelling devices. One of these attempts is to use an abradable surfacing material on one of the rubbing parts. The abradability is achieved by reducing the density by low sintering pressures applied to metallic powder or fibers in forming the surfacing material, or by the inclusion in the surfacing material of friable non-metallic materials as for example graphite or diatomaceous earth. Such seals are expensive to produce. Sintered or sprayed layers also have poor adhesion to the base material and their open texture permits oxidation and consequent embrittlement. They are also susceptible to rapid erosion by engine carbon and dust particles. Moreover, increasing the density of the layer to overcome these problems can result in a resistant surface which damages the rotating part.

Attempts have also been made to surface the parts subject to rubbing contact with a material which fuses at the temperature induced by the friction of a rub. In this connection, the use has been suggested of eutectic alloys with fixed melting points (similar to a pure metal) and alloys with a "mushy" melting condition. A eutectic alloy would be ideal in that the minimum quantity of heat would be needed to take the seal from solid to liquid at the point or line of contact with the knife edge. However, there are other important considerations. An alloy with a larger range between the solidus temperature (first sign of melting) and the liquidus temperature (at which the entire alloy is melted) may have a lower thermal conductivity which would tend to concentrate the heat at the point or line of contact. The "mushy" alloy will melt in the films between the higher melting point constituents which destroys its effective strength so that the material is displaced with less total heat input. The "compressible" type of seal relies on deforming the material and the "abradable" type of seal relies on chipping or gouging the material. Both types of seals suffer the limitation that the very high temperature generated at the line of contact may be sufficient to flow the surface material so that when the rubbing ceases a hard skin is formed which could damage the rotating member at the next contact.

Such materials are difficult to attach securely to the base material and are also degraded by the abrasive and erosive action of solid particles in the gas stream.

SUMMARY OF THE INVENTION

The present invention aims to overcome the shortcomings of these prior expedients as well as to provide certain other advantages as will be clear from the following. The applicant provides a sealing structure such that in the event of a rub between the rotating and stationary members, the seal construction melts instantaneously at the point of contact to allow the metal to be displaced, permitting free rotation of the rotatable member. This is provided according to the invention as follows. Sealing means is applied to one of the surfaces of the seal, usually to the stationary surface, including a sealing layer of a metal alloy having a melting point close to, but above, the operating temperature of the rotating surface and below the melting point of the stationary surface. An intermediate bonding layer bonds the sealing layer to the surface. The bonding layer is of an alloy compatible with the sealing layer and with the metal of the base surface such that it will form a good brazed bond with both and such that it will melt initially at a temperature lower than the temperature of either and will have a remelt temperature above said operating temperature and adequate strength at the operating temperature. The material of the sealing layer is adapted, in the event of a rub to melt instantaneously at the contact surface in the immediate area of the rub whereby the metal is molten and is readily displaced to allow free rotation of the rotatable member. Unlike seals, in which the seal material is merely abraded or deformed, the sealing layer is of a material which is fully dense or of reduced controlled density.

In accordance with the invention the sealing layer can be applied by conventional metal application techniques, for example such as those used in applying the brazing alloys contained in a vehicle and subsequent fusion. These techniques include spraying or painting on a paste with the alloy in finely divided form in a vehicle, which may, for instance be a synthetic resin, or the alloy may be contained in a solid metal strip attachable to the substrate by brazing.

More specifically, characteristics of the alloy of the sealing layer are as follows. It must be oxidation resistant. It must not flow when being fused to the bonding layer. It must be such at operating temperature the seal does not sag or run. The face of the seal will normally be solid or fully dense in character without significant porosity, but reduced density in the form of discrete voids is permissible up to the limits imposed by the reduction of mechanical strength, erosion and corrosion resistance or sealing efficiency which is up to about 30 percent reduction in density. Reduced density would increase leakage past the knife edges and more rapid oxidation under the high temperature application. This contrasts with the compressible type of seal which is dependent on low density.

The invention will be further explained by reference to the accompanying drawing illustrating a preferred embodiment.

Figure 2:
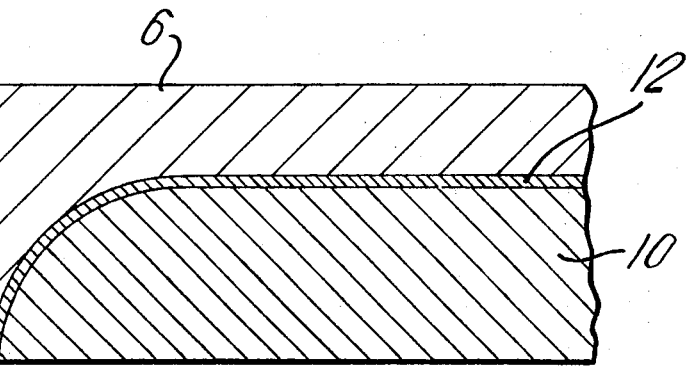

FIG. 1 is a fragmentary cross-section showing a stationary shroud over a stator vane and a rotor vane; and FIG. 2 is an enlarged fragmentary view of the seal bonded to the shroud.

The following is a typical application of the present invention in providing a seal between the stationary shroud 6 and a rotating impeller vane 8 of turbines. This seal 10 was applied to the second and third stage turbine shrouds of the engine known under the model number JT15D. The bonding layer 12 was of "Nicrobraz 125" (trade mark) representing an alloy having the following composition:

Cr : 14.0
B : 3.5
Si : 4.5
Fe : 4.5
C : 0.7
Ni : balance and "Nicrogap 108" (trade mark) representing an alloy have the following composition:
Cr: 15.0
Fe: 7.0
Si: 0.75
B : 0.2
Ni: balance for the sealing layer these alloys are disclosed in "Nicrobraz Engineering Data Sheet No. 2.1.2 and 2.2.14" respectively published by Wall Colmonoy Corp. in 1966. "Nicrobraz 125" has a brazing range of 1,950°F to 2,200°F. "Nicrogap 108" has a melting point above 2,400°F, but is diluted by the "Nicrobraz 125" so that the remelt temperature was above 2,000°F. The tip speed on the second and third stage turbine blades was approximately 1,000 ft./sec. and the temperatures about 1,300°F and 1,100°F respectively. The tip clearance was nominally 0.015 inches. The thickness of the bonding layer was about 0.005 inches and either 0.010 inches or 0.040 inches for the face layer depending on the amount of gap to be filled on the particular engine. The "Nicrobraz 125" was sprayed on and air dried. It was then fused in hydrogen. The "Nicrogap 108" was sprayed over the fused "Nicrobraz 125" and air dried. Excess alloy was scraped off. The seal was then fused.

As shown in the drawing, the shroud 6 includes an annular recess into which the seal 10 is provided and held to the shroud by means of the bonding layer 12.

I claim:

1. Sealing means for a gas impelling device including surfaces in close proximity between which there is relative movement, one surface being that of a stationary member and the other surface being that of a rotating member, comprising,
  a composite sealing structure including an outer sealing layer constituting the proximate surface of one member and an intermediate bonding layer bonding the sealing layer to the base surface of said one member,
  the sealing layer being of a metal alloy such that its melting point is close to but above the operating temperature in the impelling device and below the melting point of the other member,
  the bonding layer being of an alloy compatible with the alloy of the sealing layer and with the base metal and forming a firm bond with both the sealing layer and the base metal surface and being adapted to melt initially at a temperature lower than the temperature of either and having a remelt temperature above the operating temperature of the impelling device, and having good strength at said operating temperature,
  the sealing structure being adapted, in the event of a rub, to melt immediately at the rubbed surface whereby the metal is molten and readily displaced to allow free passage of the rubbing surface of the other member.

2. Sealing means, as defined in claim 1, in which the sealing structure is on the surface of the stationary member.

3. Sealing means, as defined in claim 2, in which the gas impelling device is a gas turbine.

4. Sealing means, as defined in claim 1, in which the alloys used for the sealing layer and the bonding layer are brazing alloys.

5. Sealing means as defined in claim 1, in which the sealing layer consists of an alloy having the following composition:
Cr: 14.0
B : 3.5
Si: 4.5
Fe: 4.5
C : 0.7
Ni: balance the parts being in per cent by weight.

6. Sealing means as defined in claim 5, in which the bonding layer consists of an alloy having the following composition:
Cr: 15.0
Fe: 7.0
Si: 0.75
B : 0.2
Ni: balance the parts being in per cent by weight.

* * * * *